US006917753B2

(12) United States Patent
Cooper

(10) Patent No.: US 6,917,753 B2
(45) Date of Patent: Jul. 12, 2005

(54) RADIANT HEATER

(76) Inventor: Richard Cooper, 60274 Woodside Rd., Bend, OR (US) 97702

( * ) Notice: Subject to any disclaimer, the term of this patent is extended or adjusted under 35 U.S.C. 154(b) by 86 days.

(21) Appl. No.: 10/401,906

(22) Filed: Mar. 28, 2003

(65) Prior Publication Data

US 2004/0190882 A1 Sep. 30, 2004

(51) Int. Cl.$^7$ ................................................ F24H 3/02
(52) U.S. Cl. ...................... 392/363; 392/448; 219/542
(58) Field of Search ............................ 392/363, 448; 219/219; 248/542

(56) References Cited

U.S. PATENT DOCUMENTS

| 4,817,906 A | * | 4/1989 | Ellison ........................ 248/542 |
| 5,138,134 A | * | 8/1992 | Ellison ........................ 392/448 |
| 5,616,266 A | | 4/1997 | Cooper |
| 5,731,569 A | * | 3/1998 | Crescenzo .................. 219/219 |
| 6,376,816 B2 | | 4/2002 | Cooper et al. |
| 6,736,997 | * | 5/2004 | Olding et al. ............... 252/512 |

FOREIGN PATENT DOCUMENTS

DE          3002273    *  7/1981   ........... B32B/18/02

* cited by examiner

*Primary Examiner*—Robin O. Evans
*Assistant Examiner*—Leonid Fastovsky
(74) *Attorney, Agent, or Firm*—Glenn C Brown

(57) ABSTRACT

A heater including an electrically insulative panel having a decorative image on a first side and a resistive heating layer on the second side. The resistive heating layer is preferably a graphite containing sol gel material. The invention can also include a surface or support for supporting an article such as a towel or piece of clothing adjacent to the heated surface to heat and/or dry the article.

9 Claims, 2 Drawing Sheets

RADIANT HEATER

This invention relates to heaters, and in particular to a radiant heater. There are many types of space heaters that can be used to heat a particular room or area. Included among the variety of available space heaters are various convection heaters that usually include a burner and a fan for circulating the heated air, and which can be powered by electricity or fossil fuel. Other designs include radiant heaters. Among the radiant heaters are electrical heaters that heat liquid within a vessel, which in turn heats the surface of the vessel, which in turn radiates heat into the surrounding space. Another known radiant heater design consists of a resistive heating coil mounted in a reflective dish. As the coil is heated the reflective dish disperses and reflects the radiant heat from the coil into the surrounding space. This type of heater is useful in directing the radiant heat to a particular area or in a particular direction.

Each of these known types of heaters will provide heat with more or less efficiency, but each must be placed on the floor or on a counter in the space, preventing that space from being used for other purposes. In addition, the heaters are not particularly attractive. They can be ornamented in different ways, but are still utilitarian in appearance.

A need therefore remains for a heater that can be conveniently placed within a room and efficiently heat the room, while contributing to the overall decor of the room.

SUMMARY OF THE INVENTION

This invention meets the need for an efficient, attractive space heater by providing a flat panel radiant heater that includes a first layer of a resistive thick film disposed on an insulating panel. In one preferred embodiment the insulating panel is a flat panel of mica. A resistive film is disposed on one surface of the insulative mica panel and is connected to an electrical source by conductive traces along opposite sides of the resistive film that serve as buses. The decorative image on the opposite surface of the insulating panel is in the form of a painting or print for example, permitting the heater to serve as a decoration in the room. In one embodiment the decorative image is in the form of paint applied directly to the mica panel. In another embodiment the decorative image is in the form of a print or painting that is adhered to the mica panel. It can be readily seen that essentially any decorative image could be applied to the mica panel, and that a heater according to the invention is thereby suitable for use in literally any type or style of room or other space.

These and other features of the invention will be described below in greater detail by reference to the drawings.

DETAILED DESCRIPTION

Figure 1:
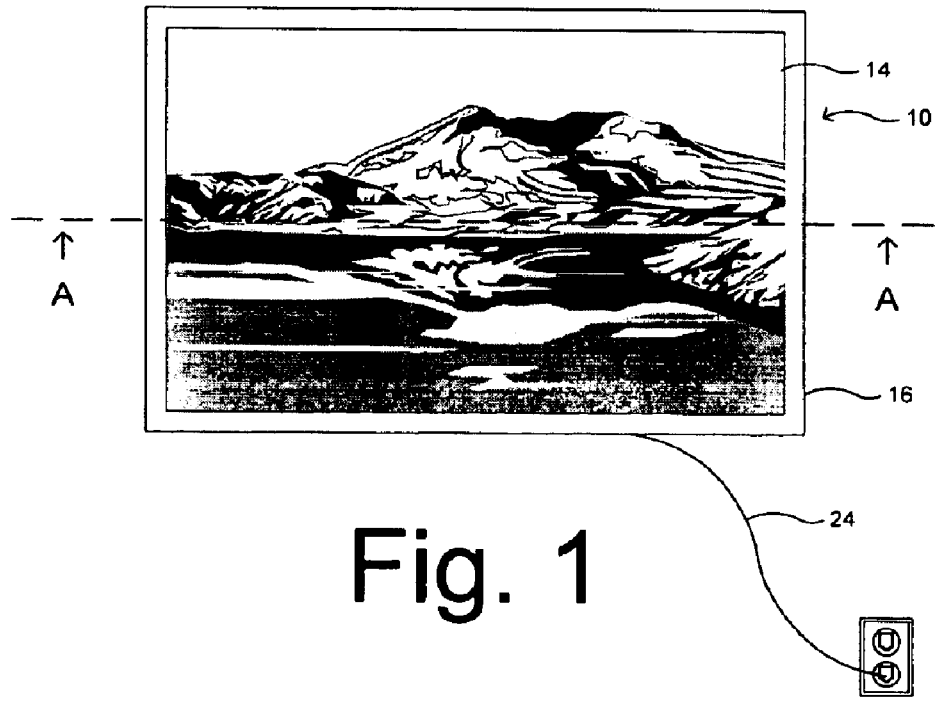
FIG. 1 is a front view of a heater according to the invention.
Figure 2:
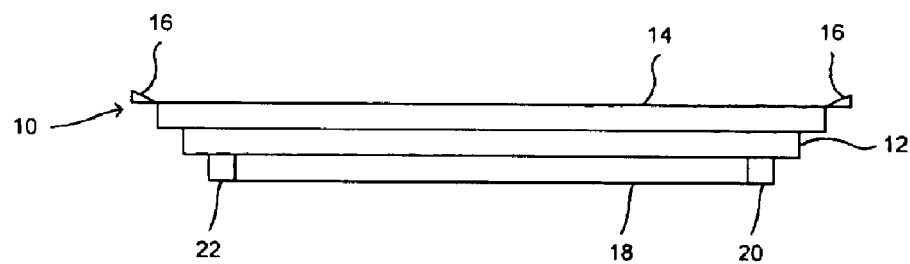
FIG. 2 is a cross-sectional view along line A—A in FIG. 1.
Figure 3:
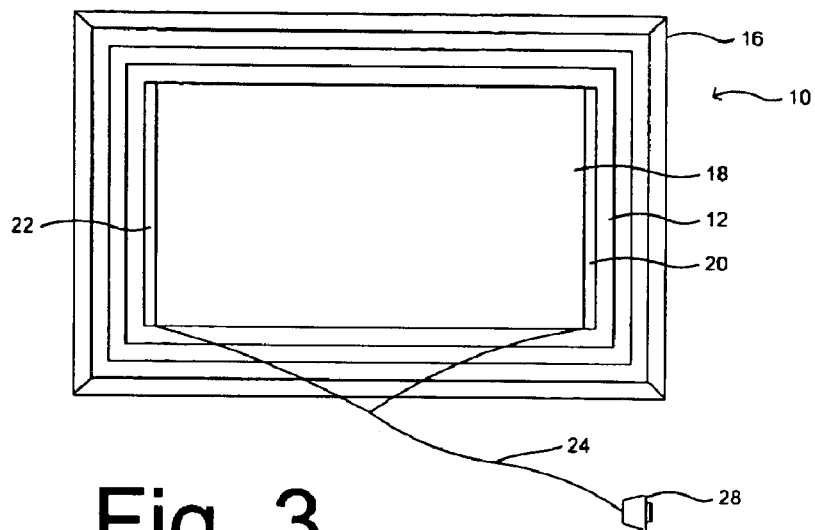
FIG. 3 is a rear view of the heater shown in FIG. 1.

Turning now to FIGS. 1–3 a preferred embodiment of the invention is shown generally at 10. Heater 10 includes a central insulative panel 12, a decorative image 14 on one side of insulative panel 12, a frame 16 around image 14, and a resistive heating film 18 on the opposite side of insulative panel 12. Image 14 can be any form of image on most any substrate, and in one preferred embodiment is glued to insulative panel 12. Resistive heating film 18 on the opposite side of insulative panel 12 is bordered along two edges by buses 20 and 22 that connect to a power supply line 24. Power supply line 24 includes a terminal 26 that connects to a power supply such as the electrical system in a home or other building.

Heater 10 operates by passing electricity from a power supply through power supply line 24 to bus 20, through resistive heating film 18, and into bus 22. The flow of current heats resistive heating film 18, which heats insulative panel 12. Heat from insulative panel 12 in turn heats image 14. The heated outer surface of image 14 radiates heat from the heater to the surroundings.

Insulative panel 12 is preferably formed of a mica material such as Cogemicanite 505, a mica sheet material manufactured by COGEBI, Inc. of Dover, N.H. This material is a mica laminated sheet of muscovite or phlogopite, and which has high temperature resistance, high electrical resistance, and to which the image can be glued and which will bond with the resistive heating film 18 as described below. Other insulative materials having suitable insulative and forming characteristics could be used in place of Cogemicanite 505, as the invention is not intended to be limited to a particular material. Image 14 in form of a print or painting for example, is mounted on insulative panel 12 using an appropriate adhesive that is suitable for a temperature range of up to 250 F.

Resistive heating film is preferably a thick resistive film such as a graphite based sol gel manufactured by Datec Corporation of Milton, Ontario, Canada. The sol gel is preferably screen printed or sprayed onto insulative panel 12 as a liquid, and cured at 300 C. It is then stable in air up to a temperature of about 350.

In the preferred embodiment, buses 20 and 22 are preferably formed of silver and are positioned along the left and right edges of the resistive film before curing, and are bonded to the sol gel during curing. Buses 20 and 22 are formed by applying a curable silver-containing emulsion such as DuPont No. 7713. The buses could also be formed of other conductive metals such as aluminum or copper applied in ways familiar to those of skill in the art.

In other embodiments resistive heating film 18 is a thin resistive film of SnO2 measuring 1 micron or less in thickness, and which can be deposited by known deposition methods. In practice, however, the thin films are more expensive to apply, and for that reason are not the preferred embodiments of the invention.

In the preferred embodiment the power of the heater is determined by the thickness of the film and the voltage and current applied to the buses. In one example, a sheet of the mica material described above was coated with the Datec graphite-based sol gel and cured at 300. Buses were bonded to the sol gel during curing as described above. The bus-to-bus resistance was measured at 48 ohms. A voltage of 120 volts was applied, which provided a power output of 280 watts. The surface temperature of the picture rose to 185 Fahrenheit. The heater was mounted on the wall in a room measuring 10 feet by 14 feet by 8 feet. The outside air temperature was about 32, and an adjacent room was at 60. The heater heated and maintained the room at about 70.

Figure 4:
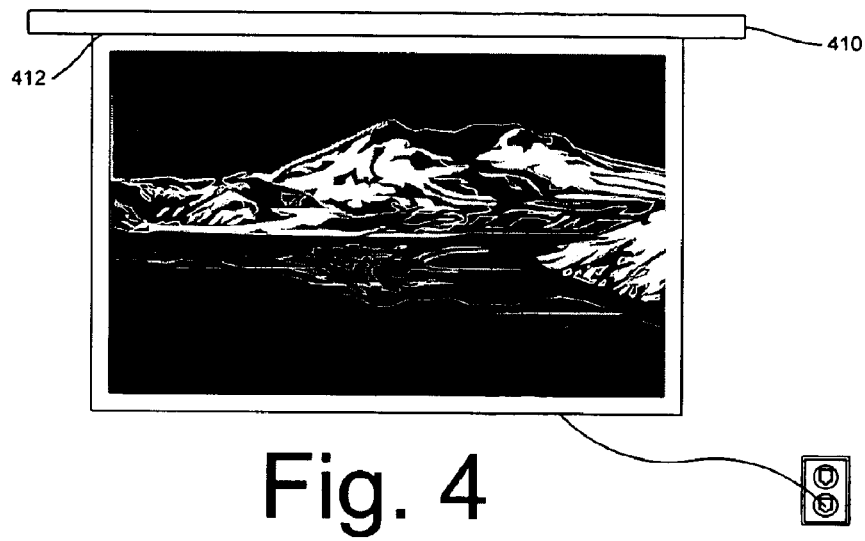
FIG. 4 is a front view of a second embodiment of the invention which includes a cooling mechanism to limit the surface temperature of the heater.
Figure 5:
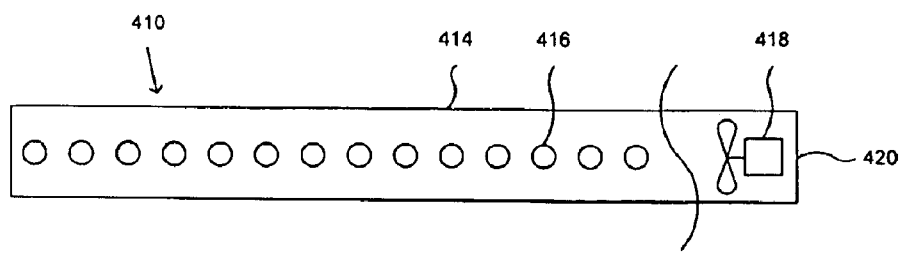
FIG. 5 is a bottom partial cutaway view of the cooling mechanism shown in FIG. 4.

In another embodiment the surface temperature of the heater can be maintained at a predetermined temperature by the use of a fan or other air moving device to direct a stream of air across the heated outer surface. In one embodiment shown in FIG. 4 an air moving device 410 is mounted along an upper edge 412 of the heater 10. Air moving device 410 directs a flow of ambient air across the surface of the heater to limit the surface temperature of the surface. Turning to FIG. 5, air moving device 410 includes a hollow housing 414, a plurality of distribution holes 416 in the lower surface of housing 414, an open end 420, and a fan 418 that draws air in through open end 420 and forces it out through distribution holes 416 across the outer surface of the heater. Fan is of any suitable design and is preferably electrically powered.

In yet another embodiment of the invention, the heater can be formed in a shape to support and warm articles (e.g. towels) as an alternative to or in addition to heating the surrounding space. Numerous designs can be envisioned that would provide either a flat surface on which the article can be placed, or that would provide a "bar" on which to hang the article to place it adjacent to the heated surface of a heater.

While the invention has been described by reference to the preferred embodiments described above, those of skill in the art will recognize that numerous modifications in arrangement and details are possible without departing from the scope of the following claims.

What is claimed is:

1. A heater comprising:
    an electrically insulative panel;
    a decorative image on a first side of the electrically insulative panel;
    a resistive heating film on a second side of the electrically insulative panel and connected to an electrical power supply; and,
    the first side of the electrically insulative panel in thermal communication with the resistive heating film to radiate heat from the first side responsive to a current flowing through the resistive film.
    wherein the resistive heating film is applied directly onto the insulative panel without any intervening layers.

2. A heater according to claim 1 wherein the electrically insulative panel is formed of a mica material.

3. A heater according to claim 1 wherein the resistive heating film comprises a graphite material.

4. A heater according to claim 3 wherein the resistive heating film is formed by applying a graphite-containing sol gel to the second side of the electrically conductive panel and curing the sol gel.

5. A heater according to claim 1 further comprising first and second buses formed along first and second edges of the resistive heating film.

6. A heater according to claim 1 wherein the decorative image on the first side of the electrically insulative panel comprises an image on a sheet that is adhered to the first side of the electrically insulative panel.

7. A heater according to claim 6 further comprising a heat conductive adhesive interposed between the sheet and the first side of the electrically insulative panel.

8. A heater according to claim 1 wherein the resistive heating film includes a resistive material selected from the group consisting of graphite and SnO2.

9. A heater according to claim 1 further comprising a support for positioning an article adjacent to the first side of the heater for warming the article.

* * * * *